United States Patent
Moon et al.

(10) Patent No.: US 8,930,968 B2
(45) Date of Patent: Jan. 6, 2015

(54) METHOD AND DRIVER FOR PROCESSING DATA IN A VIRTUALIZED ENVIRONMENT

(75) Inventors: Bo-Seok Moon, Seoul (KR); Sang-Bum Suh, Seoul (KR); Sung-Min Lee, Suwon-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 845 days.

(21) Appl. No.: 12/962,725

(22) Filed: Dec. 8, 2010

(65) Prior Publication Data

US 2011/0202706 A1    Aug. 18, 2011

(30) Foreign Application Priority Data

Feb. 18, 2010    (KR) .................. 10-2010-0014853

(51) Int. Cl.
*G06F 9/46* (2006.01)
*G06F 12/08* (2006.01)
*G06F 9/455* (2006.01)

(52) U.S. Cl.
CPC .. *G06F 9/45558* (2013.01); *G06F 2009/45579* (2013.01)

USPC ................ 719/324; 711/6; 711/137; 719/319

(58) Field of Classification Search
None
See application file for complete search history.

(56) References Cited

U.S. PATENT DOCUMENTS

| | | | |
|---|---|---|---|
| 5,408,617 A | 4/1995 | Yoshida | |
| 5,959,886 A | 9/1999 | Devin et al. | |
| 7,430,640 B2 * | 9/2008 | Schmuck et al. | 711/137 |
| 7,631,148 B2 * | 12/2009 | Fair | 711/137 |
| 2005/0166030 A1 | 7/2005 | Klein et al. | |
| 2006/0026364 A1 | 2/2006 | Haswell | |
| 2006/0206538 A1 | 9/2006 | Veazey | |
| 2009/0106766 A1 | 4/2009 | Masuda | |

\* cited by examiner

*Primary Examiner* — Gary Portka
(74) *Attorney, Agent, or Firm* — NSIP Law

(57) ABSTRACT

A data processing method and driver capable of reducing transactions between operating systems (OS) in a virtualization environment that supports a plurality of operating systems are provided. The data processing driver reads, when reading data, an Inode of next data. Then, the data processing driver determines whether or not to request an Inode to a host OS by comparing the read Inode with a requested Inode.

17 Claims, 8 Drawing Sheets

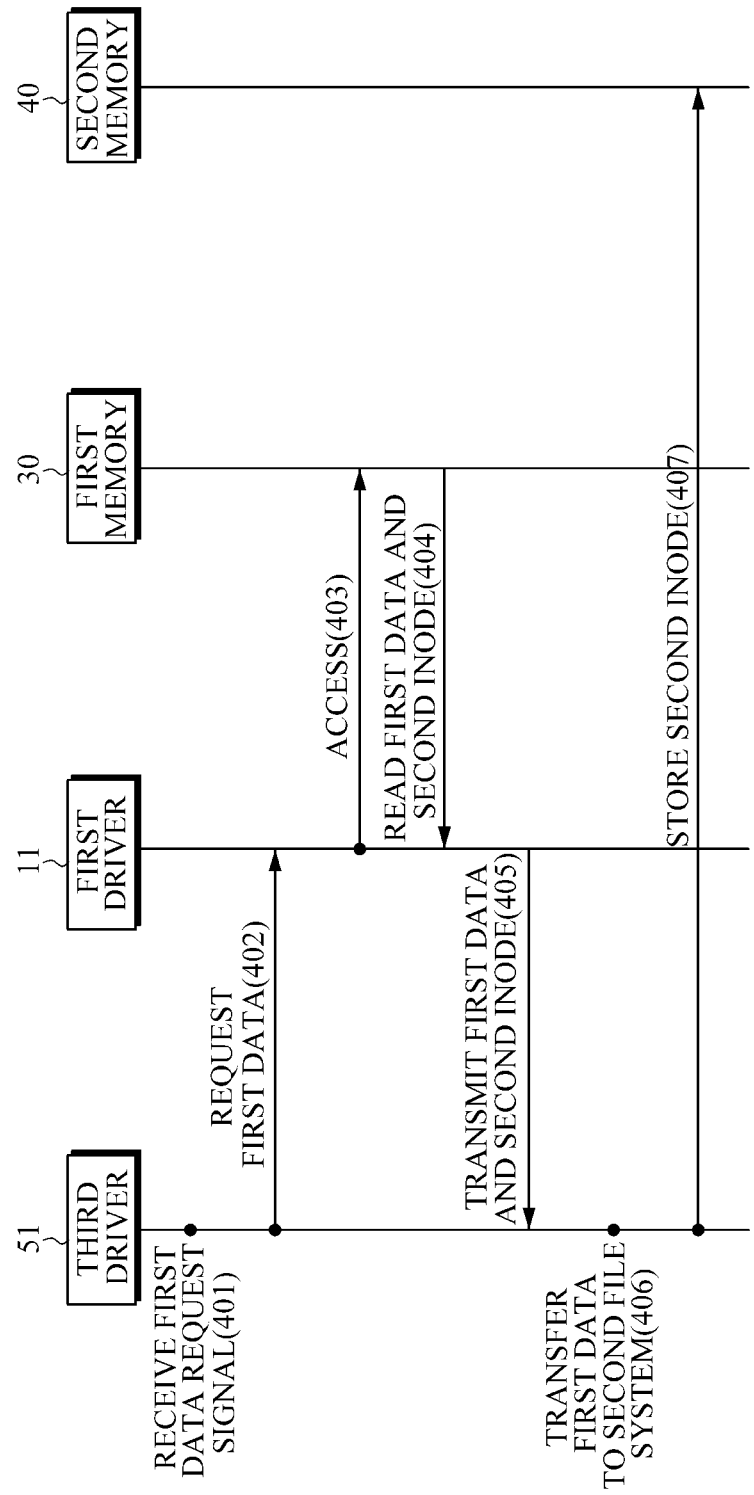

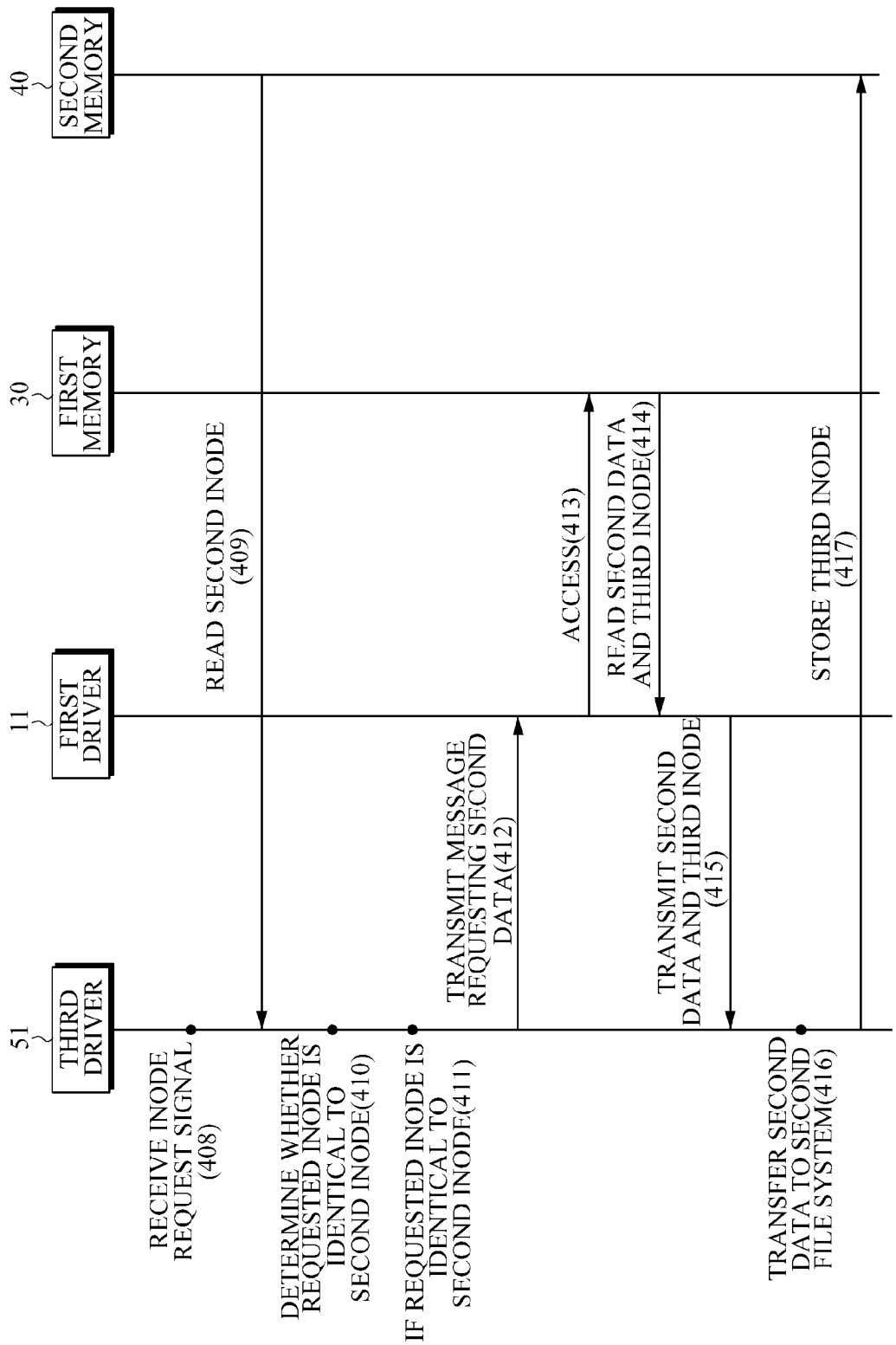

METHOD AND DRIVER FOR PROCESSING DATA IN A VIRTUALIZED ENVIRONMENT

CROSS-REFERENCE TO RELATED APPLICATION

This application claims the benefit under 35 U.S.C. §119(a) of Korean Patent Application No. 10-2010-0014853, filed on Feb. 18, 2010, the entire disclosure of which is incorporated herein by reference for all purposes.

BACKGROUND

1. Field

The following description relates to a virtualization technology that supports a plurality of operating systems.

2. Description of the Related Art

An operating system (OS) typically includes a group of programs that provide interfaces which allow users to utilize hardware in computing devices such as personal computers. An OS may manage resources, such as processors, memories, input/output devices, communication devices, data, and the like.

Recently, a virtualization technique has been developed in which a virtual layer supports a plurality of operating systems simultaneously operating on a single device. For example, the virtualization technology may form a virtualized layer or a Hypervisor to provide a virtualized layer on a host OS in order to create a plurality of logical virtual machines (VMs) on the virtualized layer. For example, the virtualization technique may be used to implement a system that includes a single host OS and a plurality of guest OSs.

However, because many transactions may be made between the plurality of OSs, the performance of the system may degrade easily. For this reason, studies into a technique for efficient transactions between a plurality of OSs are actively being researched.

SUMMARY

In one general aspect, there is provided a data processing driver which accesses a first memory through a host operating system (OS) in a virtualized environment, the data processing driver comprising a read unit to read, when receiving a signal for requesting the reading of first data corresponding to a first Inode, the first data stored in the first memory and a second Inode corresponding to second data through the host OS, and a write unit to store the second Inode in a second memory that the data processing driver has direct access to.

The read unit may determine, when receiving a signal for requesting an Inode, whether the requested Inode is the same as the second Inode stored in the second memory, and if the requested Inode is the same as the second Inode, the read unit may read the second data stored in the first memory corresponding to the second Inode and a third Inode corresponding to third data.

The read unit may determine, when receiving a signal for requesting an Inode stored in the first memory, whether the requested Inode is the same as the second Inode stored in the second memory, and if the requested Inode is not the same as the second Inode, the read unit may read the requested Inode through the host OS.

The read unit may read, when receiving a signal for requesting reading of fourth data corresponding to the requested Inode after reading the requested Inode, the fourth data stored in the first memory and a fifth Inode corresponding to fifth data through the host OS.

The second memory may temporarily store data that is to be stored in the first memory, and the write unit may determine, when receiving a signal for requesting storing of data, whether a sum of a size of the data requested to be stored and a size of the data temporarily stored in the second memory exceeds a page size in which data is stored in the first memory, and if the sum of the size of the data requested to be stored and the size of the data temporarily stored in the second memory is smaller than the page size, the write unit may temporally store the data requested to be stored, in the second memory.

If the sum of the size of the data requested to be stored and the size of the data temporarily stored in the second memory exceeds the page size, the write unit may store data corresponding to the page size in the first memory through the host OS.

After storing the data requested to be stored in the second memory, the write unit may transmit a signal informing that the data requested to be stored has been stored to a file system.

The data processing driver may be installed in a guest operating system (OS).

The second Inode may be successively stored in the first memory, following the first data.

In another aspect, there is provided a data processing method of accessing a first memory through a host operating system (OS) in a virtualized environment, the data processing method comprising reading, when receiving a signal for requesting reading of first data corresponding to a first Inode, the first data stored in the first memory and a second Inode corresponding to second data through the host OS, and writing the second Inode in a second memory to allow direct access.

The reading may comprise determining, when receiving a signal for requesting an Inode, whether the requested Inode is the same as the second Inode stored in the second memory, and reading, if the requested Inode is the same as the second Inode, second data stored in the first memory and corresponding to the second Inode and a third Inode corresponding to third data.

The reading may comprise determining, when receiving a signal for requesting an Inode stored in the first memory, whether the requested Inode is the same as the second Inode stored in the second memory, and reading, if the requested Inode is not the same as the second Inode, the requested Inode through the host OS.

The reading of the requested Inode may comprise reading, when receiving a signal for requesting reading of fourth data corresponding to the requested Inode after reading the requested Inode, the fourth data stored in the first memory and a fifth Inode corresponding to fifth data through the host OS.

The second memory may temporarily stores data that is to be stored in the first memory, and the writing of the second Inode may comprise determining, when receiving a signal for requesting storing of data, whether a sum of a size of the data requested to be stored and a size of the data temporarily stored in the second memory exceeds a page size in which data is stored in the first memory, and if the sum of the size of the data requested to be stored and the size of the data temporarily stored in the second memory is smaller than the page size, temporarily storing the data requested to be stored, in the second memory.

The writing may comprise, if the sum of the size of the data requested to be stored and the size of the data temporarily stored in the second memory exceeds the page size, storing data corresponding to the page size in the first memory through the host OS.

The writing of the second Inode may further comprise transmitting, after storing the data requested to be stored, in the second memory, a signal informing that the data requested to be stored has been stored to a file system.

In another aspect, there is provided a data processing driver, comprising a read unit to access a first memory through a host operating system (OS) in a virtualized environment, wherein when the data processing driver receives a request for first data corresponding to a first Inode, the read unit reads the first data stored in the first memory and a second Inode corresponding to second data, through the host OS, and a write unit to store the second Inode in a second memory that the data processing driver has direct access to.

Other features and aspects may be apparent from the following description, the drawings, and the claims.

BRIEF DESCRIPTION OF THE DRAWINGS

FIGS. 4A, 4B, and 4C are flowcharts illustrating examples of a method of processing data in a virtualized environment.

Throughout the drawings and the description, unless otherwise described, the same drawing reference numerals should be understood to refer to the same elements, features, and structures. The relative size and depiction of these elements may be exaggerated for clarity, illustration, and convenience.

DESCRIPTION

The following description is provided to assist the reader in gaining a comprehensive understanding of the methods, apparatuses, and/or systems described herein. Accordingly, various changes, modifications, and equivalents of the methods, apparatuses, and/or systems described herein may be suggested to those of ordinary skill in the art. Also, descriptions of well-known functions and constructions may be omitted for increased clarity and conciseness.

Figure 1:
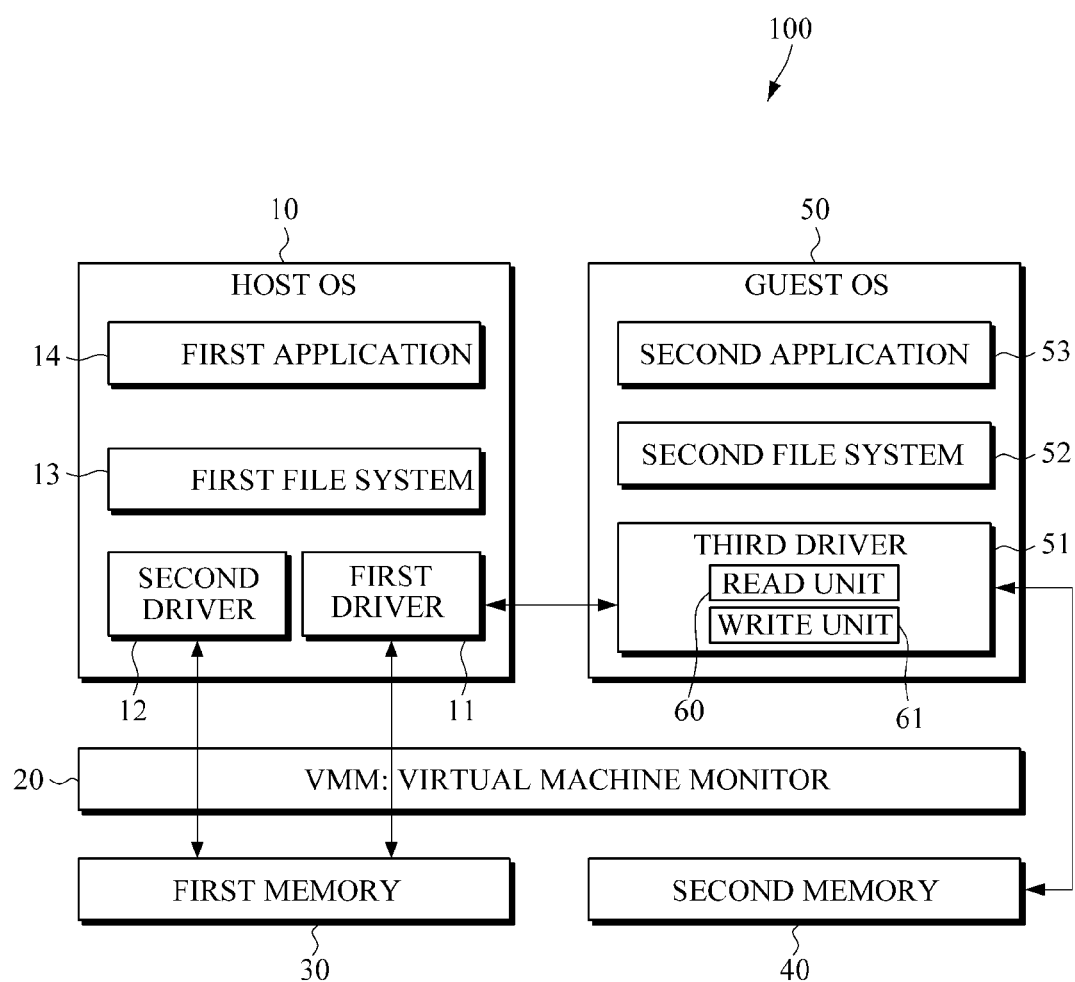
FIG. 1 is a diagram illustrating a system that includes an example of a data processing driver.

FIG. 1 illustrates a system that includes an example of a data processing driver.

Referring to FIG. 1, system 100 includes a host operating system (OS) 10, a virtual machine monitor (VMM) 20, a first memory 30, a second memory 40, and a guest OS 50. As described herein, for example, an OS may be a domain, a Virtual Machine (VM), and the like.

In this example, although the system 100 is shown to include a single guest OS 50, it should be understood that a plurality of guest OSs may be provided in the system 100. Also, in the current example, although the system 100 is shown to interact with memories 30 and 40 among various pieces of hardware, it should be understood that the system 100 may interact with other kinds of hardware, for example, additional memory, an interrupt controller, an input/output adaptor, and the like.

The host OS 10 may include a first driver 11, a second driver 12, a first file system 13, and a first application 14.

The first driver 11 may control the system 100 such that the guest OS 50 accesses the first memory 30 to read or write data, when receiving a signal for accessing the first memory 30 from the guest OS 50. For example, the first driver 11 may be a back-end driver. The back-end driver 11 may be used to transmit/receive data to/from the guest OS 50, but may not be used to transmit/receive data to/from the first file system 13.

The second driver 12 may control the system 100 for data transmission/reception between the host OS 10 and the first memory 30. For example, the second driver 12 may control the system 100 such that the host OS 10 can access the first memory 30 though the VMM 20, when receiving a data read request signal through the first file system 13 and the first application 14. The data read request signal may be a signal for reading data from the first memory 30.

In the first file system 13, a method for designating identifiers of data and reading and writing the data may be decided in advance. For example, the first file system 13 may be a New Technology (NT) file system or a File Allocation Table (FAT) file system in Windows, an EXT (Extended) file system or a Raiser file system in Linux, and the like. The first file system 13 may write data to or read data from the first memory 30 through the second driver 12 and VMM 20.

The first application 14 may be one of various applications that may be used in the host OS 10.

The VMM 20 may be installed on a middleware software layer and may virtualize hardware resources such as memory, so that OS may use the hardware resources. The VMM 20 may be a Hypervisor. Accordingly, the host OS 10 and the guest OS 50 may use a single hardware as if they use individual pieces of hardware by virtualizing the hardware.

The VMM 20 may support a connection between the first memory 30 and the host OS 10. Accordingly, the host OS 10 may access the first memory 30 through the VMM 20.

The first memory 30 may store a plurality of Inodes and data therein. For example, each Inode may include information about read, write, and/or execute permissions, information regarding a data type, information regarding an Inode number, and the like. For example, each piece of data may be matched to a respective Inode.

Figure 2:
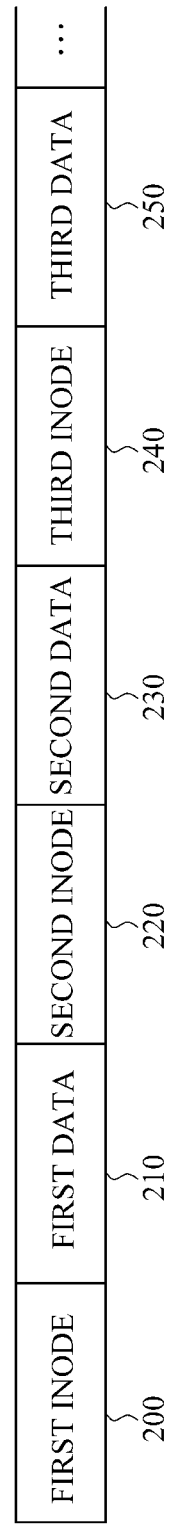
FIG. 2 is a diagram illustrating an example of a format in which Inodes and data are stored.

FIG. 2 illustrates an example of a format in which an Inode and data are stored. Referring to FIG. 2, a first Inode 200, first data 201, a second Inode 220, second data 230, a third Inode 240, and third data 250 are successively stored in that order. In this example, the first Inode 200 corresponds to the first data 210, the second Inode 220 corresponds to the second data 230, and the third Inode 240 corresponds to the third data 250.

For example, the first memory 30 may store information that may be used to execute the host OS 10, the guest OS 50, and/or the system 100.

For example, the first memory 30 may be divided into a region where only the host OS 10 may access, a region where only the guest OS 50 may access, or a region where both the host OS 10 and the guest OS 50 may access.

For example, the second memory 40 may store at least one of a plurality of Inodes stored in the first memory 30. Inodes may be stored in the second memory 40 by the guest OS 50. This process is further described later.

As another example, the second memory 40 may temporarily store data that is to be stored in the first memory 30. For example, when the size of data that is to be stored is less than the size of a page, the data may be temporarily stored in the second memory 40, instead of in the first memory 30. This process is further described later.

As an example, the guest OS 50 may access the first memory 30 through the host OS 10 and may access the second memory 40 directly.

The first and second memories 30 and 40 may be a single storage which is divided into first and second memory regions. As another example, the first and second memories 30 and 40 may be two storages.

The first and second memories 30 and 40 may include, for example, at least one storage from among a flash memory type, a hard disk type, a multimedia card micro type, a card type memory (for example, a SD or XD memory), a Random Access Memory (RAM), a Static Random Access Memory (SRAM), a Read-Only Memory (ROM), an Electrically Erasable Programmable Read-Only Memory (EEPROM), a Programmable Read-Only Memory (PROM), a magnetic memory, a magnetic disk, an optical disk, and the like.

Referring again to FIG. 1, the guest OS 50 includes a third driver 51, a second file system 52, and a second application 53. The third driver 51 includes a read unit 60 and a write unit 61.

The third driver 51 controls the system 100 such that the guest OS 50 may access the first memory 30 through the host OS 10. For example, the third driver 51 may be a front-end driver. The front-end driver 51 may be implemented to transmit/receive data to/from the second file system 52. The front-end driver 51 may not be used to directly access the first memory 30 through the virtual machine monitor VMM 20. The third driver 51 may be placed outside the guest OS 50.

The first driver 11 and third driver 51 may transmit or receive control signals, data, and the like, through a BUS and/or a shared memory.

The read unit 60 reads the requested data and an Inode corresponding to next data from the first memory 30, when the read unit 60 receives a data read request signal. For example, the data read request signal may be a signal for reading specific data from the first memory 30.

Referring to FIGS. 1 and 2, the read unit 60 reads the first data 210 and the second Inode 220 from the first memory 30 through the first driver 11, when the read unit 60 receives a first data request signal from the second file system 52. In this example, the second Inode 220 corresponds to the second data 230 and may be stored successively after the first data 210. The write unit 61 stores the second Inode 220 in the second memory 40.

Upon receiving an Inode request signal, the read unit 60 determines whether the requested Inode is the same as the Inode stored in the second memory 40. The read unit 60 may read the requested Inode from the first memory 30, or data corresponding to the Inode stored in the second memory 40 and an Inode corresponding to next data, based on the result of the determination. The read unit 60 may determine whether the requested Inode is the same as the Inode stored in the second memory 40, based on segment information, offset information, length information, and the like.

For example, the read unit 60 may determine whether the requested Inode is the same as the second Inode 220 stored in the second memory 40, when receiving an Inode request signal from the second file system 52. The Inode request signal may be a signal for reading a specific Inode from the first memory 30. When the requested Inode is the same as the second Inode 220, the read unit 60 may read the second data 230 corresponding to the second Inode 220 stored in the first memory 30 and the third Inode 240. The third Inode 240 corresponds to the third data 250 and may be stored successively after the second data 230. Accordingly, because the guest OS 50 does not need to read the second Inode through the host OS 10, the amount of times the guest OS 50 accesses the host OS 10 may be reduced.

Meanwhile, when the requested Inode is not the same as the second Inode 220, the read unit 60 may read the requested Inode (a fourth Inode) from the first memory 30 through the host OS 10. When receiving a fourth data information request signal after reading the fourth Inode, the read unit 60 may read the fourth data (not shown in FIG. 2) stored in the first memory 30 and a fifth Inode (not shown in FIG. 2). The fifth Inode corresponds to fifth data and may be stored successively after the data.

The write unit 61 may determine whether or not a sum of the size of the data that has been requested to be stored and the size of data temporarily stored in the second memory 40 exceeds a page size, when receiving a request signal for storing data. The page size refers to a unit size per which data is stored in the first memory 30.

The request signal for storing data may be a signal for storing specific data in the first memory 30. Also, the data temporarily stored in the second memory 40 may be data that could not have been stored in the first memory 30, for example, because the data size is smaller than the page size. Also, the page size may be a storage unit in which data is stored in the first memory 30. For example, the first memory 30 may be able to store data that is larger in size than the second memory 40. Accordingly, if the write unit 61 determines that the data to be stored is too large for the second memory 40, the write unit 61 may store the data in the first memory 30.

The write unit 61 may store the request data in the first memory 30 through the host OS 10 or in the second memory 40, based on the result of the determination.

Figure 3A:
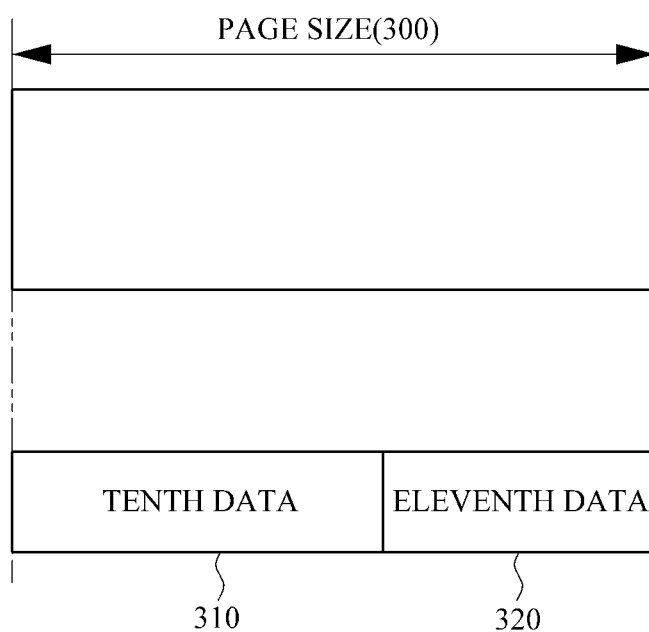
FIGS. 3A and 3B are diagrams illustrating examples of processes for temporarily storing data.
Figure 3B:
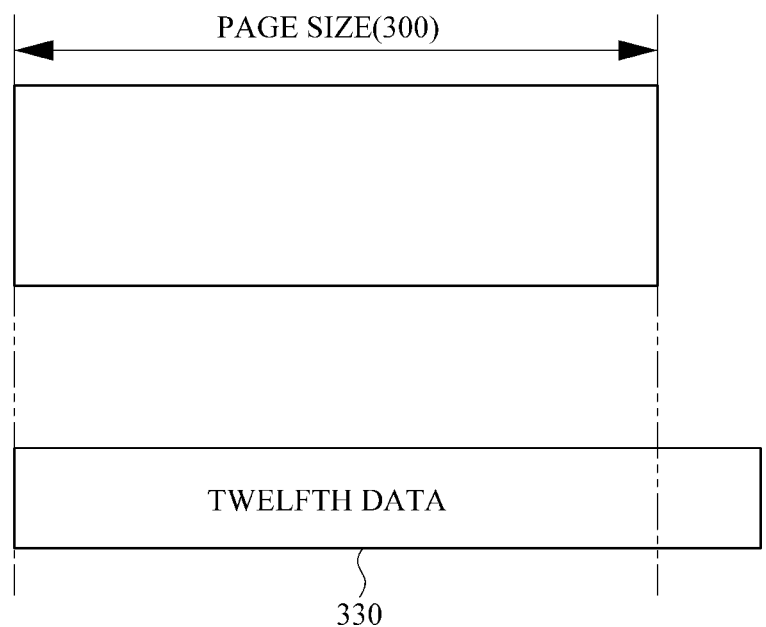

FIGS. 3A and 3B illustrate examples of a process for temporarily storing data.

FIG. 3A illustrates an example of a process for storing data when the size of data that is requested to be stored is smaller than a page size 300.

Referring to FIGS. 1 and 3A, when receiving a request signal for storing tenth data 310 from the second file system 52, the write unit 61 may determine whether or not a sum of the size of the tenth data 310 and the size of the data temporarily stored in the second memory 40 exceeds the page size 30. In the example of FIG. 3A, no data has been stored in the second memory 40. In this example, because a sum of the size of the tenth data 310 and the size of data temporarily stored in the second memory 40 are smaller than the page size (because only the tenth data 310 exists), the write unit 61 may temporarily store the tenth data 320 in the second memory 40, not in the first memory 30, through the host OS 10. After the tenth data 310 is stored in the second memory 40, the write unit 61 may transmit a signal to the second file system 32 indicating that the tenth data 210 has been stored. Accordingly, the second file system 52 may recognize that the tenth data 310 has been stored and may transmit a request signal for storing next data to the third driver 51.

When receiving a request signal for storing eleventh data 320 from the second file system 52, the write unit 61 may determine whether or not a sum of the size of the eleventh data 320 and the size of the data temporarily stored in the second memory 40 exceeds the page size 300. In this example, the data temporally stored in the second memory 40 is the tenth data. Because the sum of the tenth data 310 and the eleventh data 320 exceeds the page size 300, the write unit 61 may store data corresponding to the page size 300 in the first memory 30 through the host OS 10.

FIG. 3B illustrates an example of a process for storing data when the size of data that is requested to be stored exceeds the page size 300.

Referring to FIGS. 1 and 3B, when receiving a request signal for storing twelfth data 330 from the second file system 52, the write unit 61 may determine whether or not a sum of the size of the twelfth data 310 and the size of data temporarily stored in the second memory 40 exceeds the page size 300. In the example of FIG. 3B, because the sum of the size of the twelfth data 330 and the size of the data temporarily stored in the second memory 40 exceeds the page size 300, the write unit 61 may store data corresponding to the page size 300 in the first memory 30 through the host OS 10. After storing the data corresponding to the page size 300 among the twelfth data 330, the remaining data may be temporarily stored in the second memory 40.

In the second file system 52, a method for designating identifiers of data and reading and writing the data may be decided in advance. The second file system 52 may read data from or write data in the first memory 30 through the third driver 51, the first driver 11, and the VMM 20 based on a predetermined method.

The second application 53 may be one of various applications that may be used in the host OS 50.

When a requested Inode is the same as an Inode stored in a memory, a data processing driver may read data corresponding to the requested Inode without performing any separate process, thereby reducing transactions between OS.

The data processing driver may store the data in the memory through a host OS, when data requested to be stored exceeds a page size. Accordingly, the data processing driver may reduce transactions between OSs.

Figure 4C:
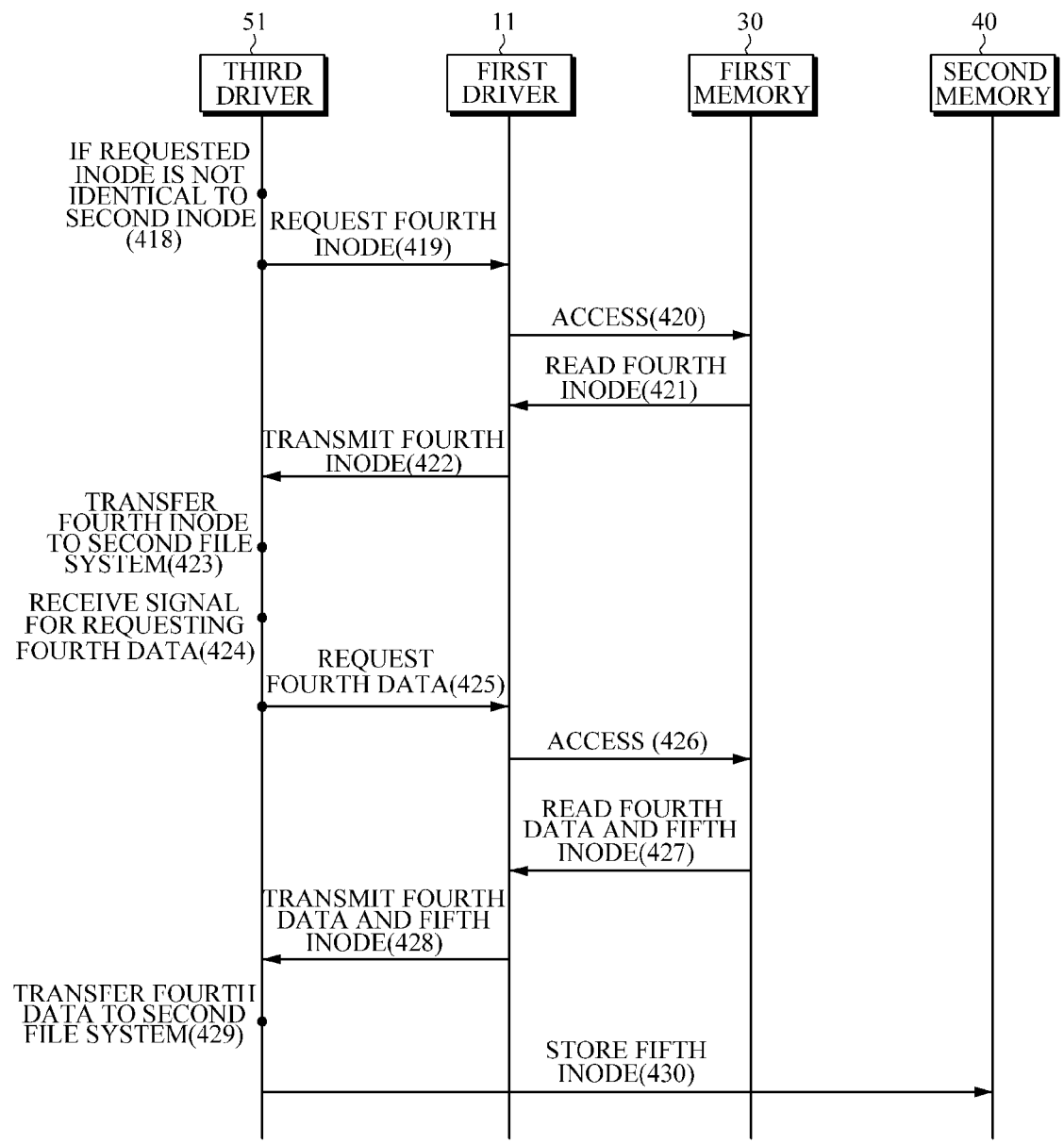

FIGS. 4A, 4B, and 4C illustrate examples of methods of processing data in a virtualized environment. For example, FIGS. 4A, 4B, and 4C are flowcharts illustrating examples of methods of reading data in a virtualized environment.

Referring to FIGS. 1, 2, and 4A, a first data request signal is received from the second file system 52 to the third driver 51, in 401. In 402, the read unit 60 of the third driver 51 transmits a message for requesting the first data 210 to the first driver 11. Accordingly, the first driver 11 accesses the first memory 30 in 403 to read the first data 210 and the second Inode 220 in 404 and transmits the first data 210 and the second Inode 220 to the third driver 51 in 405. In 406, the third driver 51 transfers the first data 201 to the second file system 52. Also, the third driver 51 stores the second Inode 220 in the second memory 40 in 407.

Referring to FIG. 4B, an Inode request signal is received from the second file system 52 to the third driver 51 in 408. In 409, the read unit 60 of the third driver 51 reads the second Inode 220 stored in the second memory 40. Successively, the read unit 60 determines whether the requested Inode is the same as the second Inode 220 in 410.

If the requested Inode is the same as the second Inode 220 in 411, the read unit 60 of the third driver 51 transmits a message for requesting the second data 230 corresponding to the second Inode 220 to the first driver 11 in 412. Accordingly, the first driver 11 accesses the first memory 30 in 413 to read the second data 230 and the third Inode 240 in 414 and transmits the second data 230 and the third Inode 240 to the third driver 51 in 415. In 416, the third driver 51 transfers the second data 230 to the second file system. Also, the third driver 51 stores the third Inode 250 in the second memory 40 in 417.

Referring to FIG. 4C, when the requested Inode (for example, a fourth Inode) is not the same as the second Inode in 418, the read unit 60 transmits a message for requesting the fourth Inode (not shown in FIG. 2) to the first driver 11 in 419. Accordingly, the first driver 11 accesses the first memory 30 in 420 to read the fourth Inode in 421 and transmits the fourth Inode to the third driver 51 in 422. In 423, the read unit 60 of the third driver 51 transfers the fourth Inode to the second file system 52. Successively, the second file system 52 may parse the fourth Inode to determine whether the fourth Inode is the same as the request Inode.

In 424, a signal for requesting fourth data corresponding to the fourth Inode is received from the second file system 52 to the third driver 51. In 425, the read unit 60 of the third driver 51 transmits a message for requesting the fourth data to the first driver 11. Successively, the first driver 11 accesses the first memory 30 in 426 to read the fourth data and a fifth Inode in 427 and transmits the fourth data and the fifth Inode to the third driver 51 in 428. In 429, the third driver 51 transfers the fourth data to the second file system 52. Also, the third driver 51 stores the fifth Inode in the second memory 40 in 430. The method of processing data in the virtualized environment is performed by repeating the above-described process.

When a requested Inode is the same as an Inode stored in a memory, a data processing driver may read data corresponding to the requested Inode without performing any separate process, thereby reducing transactions between OS.

Figure 5:
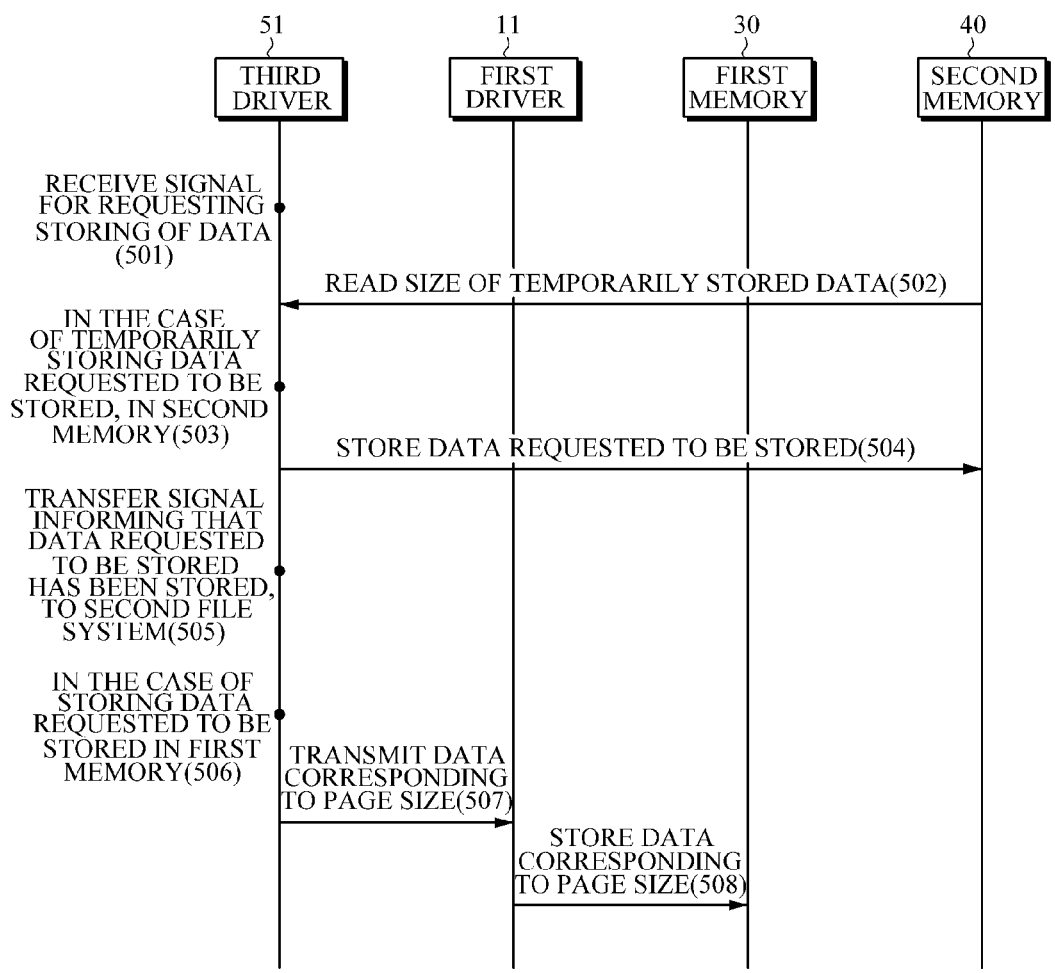
FIG. 5 is a flowchart illustrating an example of a method of processing data in a virtualized environment.

FIG. 5 illustrates an example of a method of processing data in a virtualized environment. In this example, a method of writing data in a virtualized environment is illustrated.

Referring to FIGS. 1 and 5, a signal for requesting the storing of data is received from the second file system 52 to the third driver 51 in 501. In 502, the write unit 61 of the third driver 51 reads the size of data that is temporarily stored in the second memory 40 in 502. The data temporarily stored in the second memory 40 may be data that could not have been stored in the first memory 30 because it has a size that is smaller than a page size. The page size is a basic unit in which data is stored in the first memory 30. The write unit 61 may determine whether or not a sum of the size of the data requested to be stored and the size of the data temporarily stored in the second memory 40 exceeds the page size. The write unit 61 may store the data requested to be stored in the first memory 30 through the host OS 10, or the write unit 61 may temporarily store the data in the second memory 40, based on the result of the determination.

If the sum of the size of the data requested to be stored and the size of the data temporarily stored in the second memory 40 are smaller than the page size in 503, the write unit 61 temporarily stores the data requested to be stored in the second memory 40 in 504. After storing the data requested to be stored in the second memory 40, the write unit 61 transmits a signal informing that the data requested to be stored has been stored, to the second file system 52 in 505. Accordingly, the second file system 52 may recognize that the data requested to be stored has been stored and may transmit a signal for requesting storing of next data to the third driver 51.

Meanwhile, when the sum of the size of the data requested to be stored and the size of the data temporarily stored in the second memory 40 exceeds the page size in 506, the write unit 61 transmits data corresponding to the page size to the first driver 11 in 507. The first driver 11 stores data corresponding to the page size in the first memory 30 in 508. The remaining data may be temporarily stored in the second memory 40.

The data processing driver stores the data in the memory through a host OS, when data requested to be stored exceeds a page size. Accordingly, the data processing driver may reduce transactions between OSs.

The above-described examples of the method and drivers for processing data in the virtualized environment may be entirely or selectively combined to implement various modifications.

The processes, functions, methods and/or software described above may be recorded, stored, or fixed in one or more computer-readable storage media that includes program instructions to be implemented by a computer to cause a processor to execute or perform the program instructions. The media may also include, alone or in combination with the program instructions, data files, data structures, and the like. Examples of computer-readable storage media include magnetic media, such as hard disks, floppy disks, and magnetic tape; optical media such as CD ROM disks and DVDs; magneto-optical media, such as optical disks; and hardware devices that are specially configured to store and perform program instructions, such as read-only memory (ROM), random access memory (RAM), flash memory, and the like. Examples of program instructions include machine code, such as produced by a compiler, and files containing higher level code that may be executed by the computer using an interpreter. The described hardware devices may be configured to act as one or more software modules in order to perform the operations and methods described above, or vice versa. In addition, a computer-readable storage medium may be distributed among computer systems connected through a network and computer-readable codes or program instructions may be stored and executed in a decentralized manner.

As a non-exhaustive illustration only, the terminal device described herein may refer to mobile devices such as a cellular phone, a personal digital assistant (PDA), a digital camera, a portable game console, an MP3 player, a portable/personal multimedia player (PMP), a handheld e-book, a portable labtop personal computer (PC), a global positioning system (GPS) navigation, and devices such as a desktop PC, a high definition television (HDTV), an optical disc player, a setup box, and the like, capable of wireless communication or network communication consistent with that disclosed herein.

A computing system or a computer may include a microprocessor that is electrically connected with a bus, a user interface, and a memory controller. It may further include a flash memory device. The flash memory device may store N-bit data via the memory controller. The N-bit data is processed or will be processed by the microprocessor and N may be 1 or an integer greater than 1. Where the computing system or computer is a mobile apparatus, a battery may be additionally provided to supply operation voltage of the computing system or computer.

It should be apparent to those of ordinary skill in the art that the computing system or computer may further include an application chipset, a camera image processor (CIS), a mobile Dynamic Random Access Memory (DRAM), and the like. The memory controller and the flash memory device may constitute a solid state drive/disk (SSD) that uses a non-volatile memory to store data.

A number of examples have been described above. Nevertheless, it should be understood that various modifications may be made. For example, suitable results may be achieved if the described techniques are performed in a different order and/or if components in a described system, architecture, device, or circuit are combined in a different manner and/or replaced or supplemented by other components or their equivalents. Accordingly, other implementations are within the scope of the following claims.

What is claimed is:

1. A data processing driver configured to access a first memory through a host operating system (OS) in a virtualized environment, the data processing driver comprising:
a read unit configured to read, through the host OS, a first data corresponding to a first Inode simultaneously with a second Inode corresponding to second data, in response to receiving a signal requesting the reading of the first data, the first data and the first Inode being stored in the first memory, and the second Inode and the second data being stored successively after the first data and the first Inode; and
a write unit configured to store the second Inode in a second memory that the data processing driver has direct access to.

2. The data processing driver of claim 1, wherein the read unit is configured to:
determine whether a requested Inode is the same as the second Inode stored in the second memory in response to receiving a signal requesting the requested Inode; and
read the second data stored in the first memory corresponding to the second Inode and a third Inode corresponding to third data in response to determining that the requested Inode is the same as the second Inode.

3. The data processing driver of claim 1, wherein the read unit is configured to:
determine whether a requested Inode stored in the first memory is the same as the second Inode stored in the second memory in response to receiving a signal requesting the requested Inode; and
read the requested Inode through the host OS in response to determining that the requested Inode is not the same as the second Inode.

4. The data processing driver of claim 3, wherein the read unit is configured to:
read a fourth data stored in the first memory and a fifth Inode corresponding to fifth data in response to receiving a signal requesting reading of the fourth data corresponding to the requested Inode after reading the requested Inode, through the host OS.

5. The data processing driver of claim 1, wherein:
the second memory is configured to temporarily store data stored in the first memory, and
the write unit is configured to:
determine whether a sum of a size of the data requested to be stored and a size of the data temporarily stored in the second memory exceeds a page size of which data is stored in the first memory, in response to receiving a signal requesting storing of the data, and
temporally store the data requested to be stored in the second memory, in response to determining that the sum of the size of the data requested to be stored and the size of the data temporarily stored in the second memory is smaller than the page size.

6. The data processing driver of claim 5, wherein, the write unit is configured to:
store data corresponding to the page size in the first memory through the host OS in response to determining that the sum of the size of the data requested to be stored and the size of the data temporarily stored in the second memory exceeds the page size.

7. The data processing driver of claim 5, wherein the write unit is configured to:
transmit a signal indicating that the data requested to be stored has been stored to a file system in response to storing the data requested to be stored in the second memory.

8. The data processing driver of claim 1, being installed in a guest operating system (OS).

9. The data processing driver of claim 1, wherein the second Inode is successively stored in the first memory, following the first data.

10. A data processing method of accessing a first memory through a host operating system (OS) in a virtualized environment, the data processing method comprising:
reading, through the host OS, a first data corresponding to a first Inode simultaneously with a second Inode corresponding to second data, in response to receiving a signal requesting the reading of first data, the first data and the first Inode being stored in the first memory, and the second Inode and the second data being stored successively after the first data and the first Inode; and writing the second Inode in a second memory to allow direct access.

11. The data processing method of claim 10, wherein the reading comprises:
   determining whether a requested Inode is the same as the second Inode stored in the second memory in response to receiving a signal requesting the requested Inode; and
   reading the second data stored in the first memory and corresponding to the second Inode and a third Inode corresponding to third data in response to determining that the requested Inode is the same as the second Inode.

12. The data processing method of claim 10, wherein the reading comprises:
   determining whether a requested Inode stored in the first memory is the same as the second Inode stored in the second memory in response to receiving a signal requesting the requested Inode stored in the first memory; and
   reading the requested Inode through the host OS in response to the requested Inode not being the same as the second Inode.

13. The data processing method of claim 12, wherein the reading of the requested Inode comprises:
   reading a fourth data stored in the first memory and a fifth Inode corresponding to fifth data through the host OS in response to receiving a signal requesting reading of the fourth data corresponding to the requested Inode after reading the requested Inode.

14. The data processing method of claim 10, wherein: the second memory temporarily stores data that is to be stored in the first memory; and
   the writing of the second Inode comprises
   determining whether a sum of a size of data requested to be stored and a size of the data temporarily stored in the second memory exceeds a page size of which data is stored in the first memory in response to receiving a signal requesting storing of the data, and
   temporarily storing the data requested to be stored, in the second memory, in response to determining that the sum of the size of the data requested to be stored and the size of the data temporarily stored in the second memory is smaller than the page size.

15. The data processing method of claim 14, wherein the writing comprises:
   storing data corresponding to the page size in the first memory through the host OS in response to determining that the sum of the size of the data requested to be stored and the size of the data temporarily stored in the second memory exceeds the page size.

16. The data processing method of claim 14, wherein the writing of the second Inode further comprises:
   transmitting, after storing the data requested to be stored, in the second memory, a signal indicating that the data requested to be stored has been stored to a file system.

17. A data processing driver, comprising:
   a read unit configured to access a first memory through a host operating system (OS) in a virtualized environment, and read, through the host OS, a first data corresponding to a first Inode simultaneously with a second Inode corresponding to second data, in response to the data processing driver receiving a signal requesting the reading of the first data, the first data and the first Inode being stored in the first memory, and the second Inode and the second data being stored successively after the first data and the first Inode; and
   a write unit configured to store the second Inode in a second memory that the data processing driver has direct access to.

* * * * *